United States Patent
Åsbogård et al.

(10) Patent No.: US 12,528,360 B2
(45) Date of Patent: Jan. 20, 2026

(54) METHOD FOR OPERATING A VEHICLE

(71) Applicant: VOLVO TRUCK CORPORATION, Gothenburg (SE)

(72) Inventors: Mattias Åsbogård, Mölnlycke (SE); Charul Sampath, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 521 days.

(21) Appl. No.: 17/754,836

(22) PCT Filed: Oct. 21, 2019

(86) PCT No.: PCT/EP2019/078587
§ 371 (c)(1),
(2) Date: Apr. 13, 2022

(87) PCT Pub. No.: WO2021/078358
PCT Pub. Date: Apr. 29, 2021

(65) Prior Publication Data
US 2024/0227571 A1     Jul. 11, 2024

(51) Int. Cl.
*B60L 7/10*     (2006.01)
*B60L 15/20*    (2006.01)

(52) U.S. Cl.
CPC ............ *B60L 7/10* (2013.01); *B60L 15/2009* (2013.01); *B60L 2240/12* (2013.01);
(Continued)

(58) Field of Classification Search
CPC .... B60L 7/10; B60L 15/2009; B60L 2240/12; B60L 2240/14; B60L 2240/486; B60L 2240/642; B60L 2250/28
See application file for complete search history.

(56) References Cited

U.S. PATENT DOCUMENTS 5,287,772 A * 2/1994 Aoki ................ B60T 1/10
                                                    180/65.265
6,378,636 B1 * 4/2002 Worrel ............. B60T 17/221
                                                    180/65.25
(Continued)

FOREIGN PATENT DOCUMENTS

| EP | 3023289 A1 | 5/2016 |
| JP | 2018083573 A | 5/2018 |
| WO | 2018045881 A1 | 3/2018 |

OTHER PUBLICATIONS

International Search Report and Written Opinion dated Jul. 23, 2020 in corresponding International PCT Application No. PCT/EP2019/078587, 10 pages.
(Continued)

*Primary Examiner* — Sohana Tanju Khayer
(74) *Attorney, Agent, or Firm* — Jeffri A. Kaminski; Venable LLP

(57) ABSTRACT

The invention relates to a method for operating a vehicle (1), wherein the vehicle (1) comprises: a driveline (2, 4) configured to provide a driving power to at least one wheel (3) of the vehicle (1) for propulsion of the vehicle (1); and a wheel brake system (5) configured to brake the vehicle (1), wherein the method comprises the steps of: receiving (S1) a control signal indicative of a request for acceleration or deceleration of the vehicle (1), wherein the acceleration or deceleration control signal is generated by an accelerator device, such as an accelerator pedal, configured to be acted upon by a driver of the vehicle (1); and controlling (S2) the driveline (2, 4) in response to the acceleration or deceleration control signal. The method comprises the steps of: providing (S3) an acceleration or deceleration threshold limit representing i) the highest vehicle acceleration that can be allowed for the received acceleration control signal in the current circumstances, or ii) the lowest vehicle deceleration (Continued)

that can be allowed for the received deceleration control signal in the current circumstances; determining (S4) a resulting vehicle acceleration or deceleration that is or will be the result from the step of controlling the electric driveline in response to the acceleration or deceleration control signal; comparing (S5) the resulting vehicle acceleration or deceleration with the corresponding acceleration or deceleration threshold limit and determining whether the resulting vehicle acceleration is or will be higher than the acceleration threshold limit or whether the resulting vehicle deceleration is or will be lower than the deceleration threshold limit; and when the resulting vehicle acceleration is or will be higher than the acceleration threshold limit or when the resulting vehicle deceleration is or will be lower than the deceleration threshold limit; applying (S6) the wheel brake system (5) so as to reduce an actual vehicle acceleration or increase an actual vehicle deceleration towards the corresponding acceleration or deceleration threshold limit.

15 Claims, 1 Drawing Sheet

(52) U.S. Cl.
CPC ..... *B60L 2240/14* (2013.01); *B60L 2240/486* (2013.01); *B60L 2240/642* (2013.01); *B60L 2250/28* (2013.01)

(56) References Cited

U.S. PATENT DOCUMENTS

| | | | |
|---|---|---|---|
| 9,174,633 | B2 | 11/2015 | Lee et al. |
| 11,753,022 | B2* | 9/2023 | Lin ................. B60L 15/20 701/22 |
| 2003/0093208 | A1* | 5/2003 | Hessmert ........... B60T 8/17551 701/72 |
| 2009/0312926 | A1* | 12/2009 | MacFarlane ......... B60W 10/06 701/59 |
| 2013/0066493 | A1 | 3/2013 | Martin et al. |
| 2014/0214299 | A1* | 7/2014 | Risse .................. B60T 17/221 701/1 |
| 2016/0362020 | A1* | 12/2016 | Shepley ............ B60L 15/2009 |
| 2017/0327095 | A1* | 11/2017 | Leitermann ........... B60T 8/171 |
| 2018/0056811 | A1* | 3/2018 | Iwahana ............... H02P 23/30 |
| 2018/0237001 | A1* | 8/2018 | Lian ..................... B60L 7/10 |
| 2018/0297594 | A1* | 10/2018 | Takahashi ............ G05D 1/0891 |
| 2021/0331664 | A1* | 10/2021 | Heise .................. B60W 30/04 |
| 2021/0370779 | A1* | 12/2021 | Ford ..................... B60L 15/06 |

OTHER PUBLICATIONS

International Preliminary Report on Patentability dated Jan. 20, 2022 in corresponding International PCT Application No. PCT/EP2019/078587, 12 pages.

European Communication under Rule 71(3) EPC dated Dec. 20, 2023 in corresponding European Patent Application No. 19798185.5, 8 pages.

* cited by examiner

METHOD FOR OPERATING A VEHICLE

CROSS-REFERENCE TO RELATED APPLICATIONS

This application is a U.S. National Stage application of PCT/EP2019/078587, filed Oct. 21, 2019 and published on Apr. 29, 2021, as WO 2021/078358 A1, all of which is hereby incorporated by reference in its entirety.

TECHNICAL FIELD

The invention relates to a method for operating a vehicle, in particular a vehicle comprising an electric driveline, so as to avoid an acceleration/deceleration that is higher/lower than desired.

Although the invention will be described with respect to a bus, the invention is not restricted to this particular vehicle but may also be used in other vehicles, such as trucks or working machines (wheel loaders, etc.).

BACKGROUND

A driveline of an electric vehicle is typically provided with: at least one electric motor configured to provide a driving power to the vehicle wheels; a rechargeable energy storage system, such as a Li-ion battery pack, for providing the electric motor with electric energy; and a regenerative braking system configured to supply energy to the energy storage system while braking the vehicle. In most cases the electric motor works also as an electric generator and thus forms part of the regenerative braking system. A wheel brake system including e.g. conventional friction brakes is normally also provided to brake the vehicle as a complement or alternative to the regenerative braking system.

One of many challenges related to electric vehicles is how to control the electric driveline including how to control the regenerative braking system for adjusting acceleration and deceleration. A particular challenge is how to control the vehicle in situations where the energy storage system is fully or almost fully charged so that the regenerative braking system cannot provide sufficient braking power. A solution to this is to generally charge the energy storage system only up to a certain upper limit that is below 100%. A drawback of this is that the full potential of the energy storage system cannot be utilized.

WO2018/045881 presents another or perhaps complementary approach where a hydraulic wheel brake system is activated when the vehicle travels at a speed higher than intended downwards a hill and the state of charge (SOC) of the energy storage system is at or above 95%.

Although the method of WO2018/045881 might be useful for solving a particular problem in certain applications there is still need for developments with regard to control of the acceleration and deceleration.

SUMMARY

An object of the invention is to provide a method for operating a vehicle where the method provides for an improved control of the acceleration and deceleration. This object is achieved by a method according to claim 1. Further aspects of the invention achieving corresponding objects include a vehicle and computer related means as defined in the claims.

The invention relates to a method for operating a vehicle comprising: a driveline configured to provide a driving power to at least one wheel of the vehicle for propulsion of the vehicle; and a wheel brake system configured to brake the vehicle, wherein the method comprises the steps of: receiving (S1) a control signal indicative of a request for acceleration or deceleration of the vehicle, wherein the acceleration or deceleration control signal is generated by an accelerator device, such as an accelerator pedal, configured to be acted upon by a driver of the vehicle; and controlling (S2) the driveline in response to the acceleration or deceleration control signal.

The method further comprises the steps of:
providing (S3) an acceleration or deceleration threshold limit representing i) the highest vehicle acceleration that can be allowed for the received acceleration control signal in the current circumstances, or ii) the lowest vehicle deceleration that can be allowed for the received deceleration control signal in the current circumstances;

determining (S4) a resulting vehicle acceleration or deceleration that is or will be the result from the step of controlling the driveline in response to the acceleration or deceleration control signal;

comparing (S5) the resulting vehicle acceleration or deceleration with the corresponding acceleration or deceleration threshold limit and determining whether the resulting vehicle acceleration is or will be higher than the acceleration threshold limit or whether the resulting vehicle deceleration is or will be lower than the deceleration threshold limit; and when the resulting vehicle acceleration is or will be higher than the acceleration threshold limit or when the resulting vehicle deceleration is or will be lower than the deceleration threshold limit;

applying (S6) the wheel brake system so as to reduce an actual vehicle acceleration or increase an actual vehicle deceleration towards the corresponding acceleration or deceleration threshold limit.

In the first step S1 a signal is received, by a vehicle control circuit, from e.g. an accelerator pedal arranged to be acted upon by a driver of the vehicle. The signal may be based on e.g. a current angle or position of the pedal or a rate at which the pedal has been pressed down or released. In step S2 the driveline is controlled, by the vehicle control circuit, in response to the signal received. Such a control may, however, result in an undesired acceleration or deceleration. Step S2 is typically initiated almost immediately after the first step and will continue for some time. At least some of steps S3-S6 may be carried out before, during (i.e. in parallel with) and/or after step S2.

The step S3 of providing the acceleration or deceleration threshold limits means that the highest/lowest allowed acceleration/deceleration, respectively, is provided for the signal received under the particular circumstances. The threshold limits may depend on both the signal, such as on pedal position or rate of position change, as well as on vehicle conditions, such as on current weight or speed of the vehicle or whether the vehicle is longitudinally inclined (i.e. whether it is positioned on a hillside with its front facing upwards or downwards) or whether a reverse gear is activated. The threshold limits may be calculated based on present conditions or be taken from a table with pre-calculated values. The step S3 may be carried out more or less continuously during operation of the vehicle.

The step S4 of determining the resulting vehicle acceleration or deceleration that is or will be the result from the step of controlling the driveline in response to the acceleration/deceleration signal means that the actual acceleration/ deceleration is determined based on measurement of acceleration/deceleration or speed (i.e. several measurements of speed during some time interval so as to allow for calculation of the acceleration/deceleration) or that an expected resulting acceleration/deceleration is calculated in beforehand (i.e. before the actual acceleration/deceleration reaches the expected value). It is possible to both calculate an expected resulting acceleration/deceleration and measure, or determine based on measurements, the actual resulting acceleration/deceleration.

In most cases where the driveline functions properly (and, in the case of an electric driveline, where the energy storage system is not fully charged) the expected and actual acceleration/deceleration will be the same and will not be above or below the corresponding threshold, respectively. A properly functioning electric driveline means that the regenerative braking system works as it should and controlling such an electric driveline in response to the acceleration/deceleration signal simply leads to an intended acceleration or deceleration. However, if the regenerative braking system does not work as it should, because the energy storage system is fully charged or electric batteries are too cold or some electric component is damaged, controlling of the electric driveline in response to the signal may not lead to an intended acceleration or deceleration, in particular if the vehicle is travelling downhill. A malfunctioning mechanical or hydraulic driveline may also lead to an undesired/non-intentional acceleration or deceleration.

The step S5 of comparing the resulting vehicle acceleration or deceleration with the corresponding threshold limit and determining whether it is (if measuring actual acceleration) or will be (if calculating expected value in beforehand) higher/lower than the corresponding threshold limit makes it possible to take action if needed. If the acceleration is not too high or if the deceleration is not too low, no particular action is needed. However, when the resulting vehicle acceleration is or will be higher than the acceleration threshold limit or when the resulting vehicle deceleration is or will be lower than the deceleration threshold limit, the method comprises the step S6 of applying the wheel brake system so as to reduce the actual vehicle acceleration or increase the actual vehicle deceleration towards the corresponding acceleration or deceleration threshold limit.

The method thus provides for identification of an acceleration/deceleration that is (actual) or will be (expected) higher/lower than desired (i.e. higher or lower than the corresponding threshold level) and for adjustment of the acceleration or deceleration (by applying the wheel brake system) so as to keep it within a desired interval. A general effect of this is increased safety since the driver of the vehicle, and also other road-users, better can predict the behaviour of the vehicle and avoid surprising vehicle movements. It can also be prevented that the vehicle keeps on accelerating because of a malfunctioning driveline even if the driver has completely released the accelerator pedal.

It may be noted that the driver may reduce acceleration or increase deceleration in a non-automatic way by generating a braking control signal by acting upon a braking pedal or similar braking device, which typically also would lead to activation of the wheel brake system. However, the present method relates to control signals from the acceleration device and to automatic application of the wheel brake system in situations where the acceleration or deceleration is higher or lower than desired.

The inventive method is useful for any driveline but is typically likely to be useful for an electric driveline when the regenerative braking system cannot deliver an expected braking torque and when the vehicle is located on a (steep) hill. By automatically applying the wheel brake system the vehicle will accelerate and decelerate in a normal and predictable way. A particular situation when the method is useful is when the reverse gear is activated and the driver presses onto the accelerator pedal and the vehicle starts moving backwards downhill in a steep slope. If the acceleration backwards in that situation becomes higher than the driver expects it to be, the vehicle may run into some object and/or the driver may experience a risky and scary situation and may press the brake pedal more or less in panic, which in turn poses risks for passengers of the vehicle, in particular if the vehicle is a bus crowded with sitting and standing passengers, as well as for other vehicles and road-users. A similar situation arises if the driver releases the accelerator pedal when reversing downhill and the vehicle does not decelerate as expected. Although the method is particularly useful when reversing downhill it may be useful also when driving forward and/or when the vehicle is on a flat road.

Exactly how to control the wheel brake system when applied depends on the circumstances including type of vehicle, wheel brake system, control system, etc. and also on vehicle speed, current deviation from desired acceleration/deceleration, etc.

In an embodiment, the resulting vehicle acceleration or deceleration is the actual vehicle acceleration or deceleration and the method comprises the step of: determining the actual vehicle acceleration or deceleration based on measurements of the vehicle's actual acceleration and/or speed. The actual acceleration/deceleration can be measured using an accelerometer or be calculated from readings of a vehicle speedometer. As mentioned above, an alternative or complement is to calculate the expected resulting vehicle acceleration or deceleration. Measurement-based determination of the actual acceleration or deceleration is useful also if calculating the expected acceleration or deceleration as a control measure that provides for the possibility to decrease acceleration or increase deceleration if needed.

In an embodiment, the method comprises the step of determining a magnitude or rate of change of the acceleration or deceleration control signal. The magnitude of the signal may correspond to a certain position or angle of e.g. an accelerator pedal and the rate of change may be how fast the pedal is changed between two angles or positions. If the pedal is pressed quickly to a certain position the acceleration threshold may be set higher than if the pedal is pressed slowly to the same position. Similarly, if the pedal is released quickly to a certain position the deceleration threshold may be set lower than if the pedal is released slowly to the same position. The pedal angle/position may also be used as a trigger for the method, i.e. the step of applying the wheel brake system may be deactivated if the accelerator pedal is pressed down more than, say 10%, of a maximum level. The reason may be that the driver's feeling that the vehicle behaves in an unpredictable manner is mostly notable when the pedal is only slightly pressed down (or not pressed down at all).

In an embodiment, the method comprises the step of determining a current weight and/or a current speed of the vehicle. Such information is useful for adapting driving or braking torque in the step of "controlling the driveline in response to the acceleration or deceleration control signal" and also for determining the threshold limits in the step of providing the acceleration or deceleration threshold limits.

In an embodiment, the method comprises the step of determining an inclination of the vehicle in a longitudinal direction thereof. It may also be determined whether the inclination is above an inclination threshold limit by comparing the determined inclination with the threshold limit that may be pre-set to a certain value, for instance 10° (i.e. the front of the vehicle faces upwards or downwards on a hillside with an inclination of at least 10°). In this step it is thus determined whether the vehicle is or is to be driven, forward or backwards, uphill or downhill with a certain hill inclination. The inclination may be measured by an inclination sensor, be determined from GPS coordinates, or be calculated from a relation between applied torque from the electric driveline (driving or braking torque) and actual change in speed (including some adjustments, such as for current vehicle weight).

Information on the inclination may be used to adjust acceleration/deceleration threshold limits since a lower deceleration can normally be expected and allowed when the accelerator pedal is released on a vehicle going downhill and a higher acceleration can normally be expected and allowed when the accelerator pedal is pressed down on a vehicle going downhill. Inclination information can also be used as input in the step of controlling the driveline in response to the acceleration or deceleration control signal. It is thus not necessary in all situations to make use of a threshold for the inclination; it may be useful to determine a degree of the inclination.

A step of determining whether the inclination of the vehicle in the longitudinal direction thereof is above the inclination threshold limit may also be used as a trigger for the method, i.e. the step of applying the wheel brake system may be deactivated if the inclination is determined to be below the inclination threshold. Depending on e.g. the structure of the control system it may be advantageous to not let the step of applying the wheel brake system be activated all the time.

In an embodiment, the method comprises the step of determining whether a reverse gear of the vehicle is selected. An unexpectedly high acceleration (or unexpectedly low deceleration) is much scarier for the driver and therefore more risky when going backwards than forward since the driver cannot see the road in front of him/her in the former case. Therefore, the step of determining whether the reverse gear of the vehicle is selected may be used as a trigger for the method, i.e. the step of applying the wheel brake system may be deactivated if the reverse gear is not selected. Typically, this trigger can be combined with the trigger related to inclination so that the automatic braking with the wheel brake system is activated only when reversing downhill.

In an embodiment, the driveline is an electric driveline comprising: an electric motor configured to provide a driving power to the at least one wheel of the vehicle for propulsion of the vehicle; a rechargeable energy storage system configured to provide the electric motor with electric energy; and a regenerative braking system configured to supply energy to the energy storage system while braking the vehicle, wherein the wheel brake system is configured to brake the vehicle as a complement or alternative to the regenerative braking system.

In an embodiment, the method comprises the step of determining a capacity of the regenerative braking system to supply energy to the energy storage system. It may also be determined whether said capacity is below a capacity threshold limit. A low capacity to supply energy to the energy storage system means a low braking power for the regenerative braking system. The reason might be a fully or almost fully charged energy storage system, an energy storage system in the form of a battery pack that is too cold, or that something in the electric driveline is malfunctioning. The step of determining this capacity may involve receiving a first signal indicative of the state of charge (SOC) of the energy storage system, receiving a second signal indicative of the temperature of the energy storage system and/or receiving a third signal indicative of any malfunctioning of the electric driveline. The capacity threshold limit may be a function of the SOC, the temperature of the energy storage system and the particulars of any malfunctioning (depending on component, the level of malfunctioning, etc.). The capacity threshold may be set so that if the capacity is above the threshold, the regenerative braking system can be expected to handle all acceleration or deceleration requests from the acceleration device (pedal). Accordingly, if the capacity is below that threshold, it cannot be expected that the regenerative braking system can handle all acceleration or deceleration requests. Instead of using a capacity threshold, a determined level of capacity can be used, e.g. the braking force of the wheel brake system can be adapted to the current braking power of the regenerative braking system.

If it is determined that the capacity of the regenerative braking system to supply energy to the energy storage system is below the capacity threshold limit or other level, this information can be used when calculating the expected resulting vehicle acceleration or deceleration that will be the result from the step of controlling the electric driveline in response to the acceleration/deceleration signal. The wheel brake system can then be applied already before the actual vehicle acceleration or deceleration becomes higher or lower than desired.

A step of determining whether the capacity of the regenerative braking system to supply energy to the energy storage system is below a capacity threshold limit may also be used as a trigger for the method, i.e. the step of applying the wheel brake system may be deactivated if the capacity is determined to be above the capacity threshold.

The method according to the present invention may therefore comprise one or more of the following as triggers:
 the wheel brake system is applied only when the capability of the regenerative braking system to supply energy to the energy storage system is below the capacity threshold limit;
 the wheel brake system is applied only when the inclination of the vehicle in the longitudinal direction thereof is above the inclination threshold limit; and/or
 the wheel brake system is applied only when the reverse gear of the vehicle is selected.

The invention also relates to a vehicle of any of the above types and comprising a control circuit configured to perform any of the steps of the above method.

The invention further relates to:
 a computer program product comprising program code means for performing the steps of the method above when said program is run on a computer, and to
 a computer readable medium carrying a computer program comprising program code means for performing the steps of the above method when said program product is run on a computer.

Finally, the invention relates to a control circuit for controlling a vehicle according to above, the control circuit being configured to perform the steps of the method according to above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
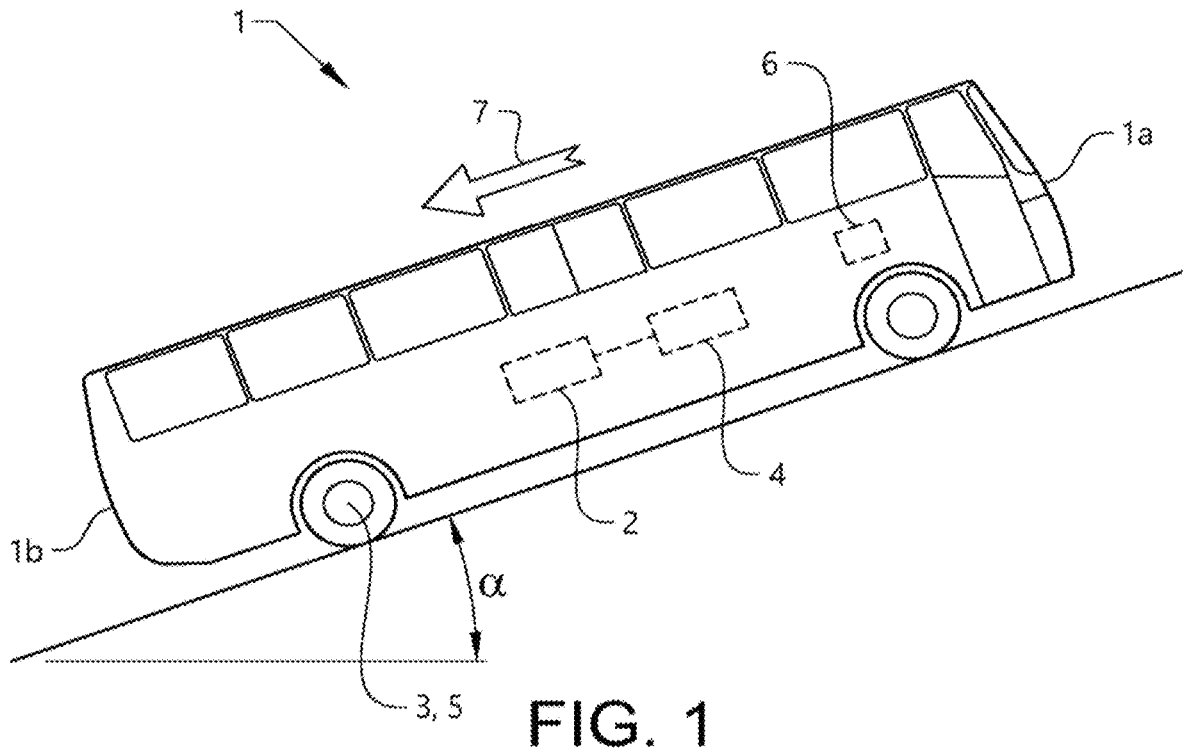
FIG. 1 shows a schematic view of a vehicle arranged to be operated by the method of this disclosure.

FIG. 1 shows a schematic view of a vehicle in the form of a bus 1 having a longitudinal direction extending between a front 1a and a rear 1b and being provided with an electric driveline. The electric driveline comprises an electric motor 2 configured to provide a driving power to at least one wheel 3 of the vehicle for propulsion of the vehicle, a rechargeable energy storage system 4 configured to provide the electric motor 2 with electric energy, and a regenerative braking system configured to supply energy to the energy storage system 4 while braking the vehicle 1. The driveline also includes a gearbox (not shown) allowing at least a selection between a forward gear and a reverse gear. In this example, the energy storage system 4 may be a Li-ion battery pack and the electric motor 2 works also as an electric generator and thus forms part of the regenerative braking system.

The vehicle 1 further comprises a wheel brake system 5 (indicated in FIG. 1 to be located where the wheel 3 is located) configured to brake the vehicle 1 as a complement or alternative to the regenerative braking system. The wheel brake system may include conventional friction brakes arranged at each wheel 3.

Further, the vehicle 1 is provided with a control circuit 6 configured to control the electric driveline, the wheel brake system 5 and other components. The control circuit 6 is arranged to receive signals from e.g. a driver of the vehicle 1 and from various components and sensors. Control circuits of this type and controlling operation of vehicles like the one in FIG. 1 are well known as such.

The vehicle 1 is arranged for being driven by a driver and it is further provided with a set of (not shown) devices allowing the driver to send control/command signals to the control circuit 6. These devices include an accelerator pedal that when pressed down or released or is kept in a certain position or at a certain angle sends a signal indicative of an acceleration or deceleration request to the control circuit 6 that controls the driveline in response to this signal. These devices also include a braking pedal that when pressed, or at least when pressed hard, leads to activation of the wheel (friction) brake system.

An angle α indicates that the vehicle 1 in FIG. 1 is inclined in the longitudinal direction thereof, i.e. the vehicle 1 is positioned on a hillside with its front 1a directed upwards and its rear 1b directed downwards. An arrow 7 indicates that the vehicle 1 is moving or is about to move backwards down the slope.

The vehicle 1 is further provided with a variety of sensors including sensors for measuring the vehicle's speed, acceleration/deceleration, inclination and weight, and for determining the temperature of e.g. the energy storage system/battery 4. Further, means are provided for determining a capacity of the regenerative braking system to supply energy to the energy storage system 4. Such means may include a battery management system (BMS) arranged to control charging and functioning of the energy storage system/battery 4.

Figure 2:
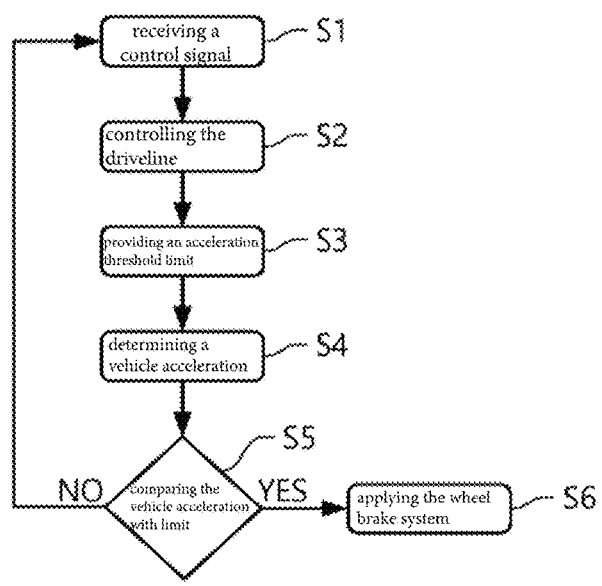
FIG. 2 shows an example of a flow diagram for the method of operating the vehicle of FIG. 1.

FIG. 2 shows an example of a flow diagram for a method of operating the vehicle 1 of FIG. 1. In this example the driver has selected the reverse gear so as to start accelerating backwards/downwards as indicated by arrow 7 in FIG. 1.

In FIG. 2, the step S1 is receiving, by the control circuit 6, a control signal indicative of a request for acceleration of the vehicle 1, wherein the acceleration control signal is generated by the accelerator pedal acted upon by the driver of the vehicle 1.

During the next step S2, the control circuit 6 controls the electric driveline in response to the acceleration or deceleration control signal.

Step S3 is providing an acceleration threshold limit representing the highest vehicle acceleration that can be allowed for the received acceleration control signal.

The subsequent step S4 is determining a resulting vehicle acceleration that is or will be the result from the step of controlling the electric driveline in response to the acceleration or deceleration control signal.

The step S5 represents comparing the resulting vehicle acceleration with the corresponding acceleration threshold limit and determining whether the resulting vehicle acceleration is or will be higher than the acceleration threshold. When the resulting vehicle acceleration is or will be higher than the acceleration threshold limit, step S6 is performed, applying the wheel brake system 5 so as to reduce an actual vehicle acceleration towards the corresponding acceleration threshold limit.

In a variant of the example above the resulting vehicle acceleration in step S4 is the actual vehicle acceleration and in that case step S4 may take the form of step S41, comprising determining the actual vehicle acceleration based on measurements of the vehicle's actual acceleration and/or speed.

In variants of the example above, the method may comprise one or more of the following steps:
  determining a magnitude or rate of change of the acceleration control signal;
  determining whether a capacity of the regenerative braking system to supply energy to the energy storage system 4 is below a capacity threshold limit;
  determining a current weight and/or a current speed of the vehicle 1;
  determining whether an inclination of the vehicle 1 in a longitudinal direction thereof is above an inclination threshold limit; and/or
  determining whether a reverse gear of the vehicle 1 is selected.

Various triggers can be used for activating the step S6, where the wheel brake system 5 is applied by automatic means (and not by the driver). When the method uses triggers it may comprise one or more of the following:
  the wheel brake system 5 is applied only when the capability of the regenerative braking system to supply energy to the energy storage system 4 is below the capacity threshold limit;
  the wheel brake system 5 is applied only when the inclination α of the vehicle 1 in the longitudinal direction thereof is above the inclination threshold limit; and/or
  the wheel brake system 5 is applied only when the reverse gear of the vehicle 1 is selected.

It is to be understood that the present invention is not limited to the embodiments described above and illustrated in the drawings; rather, the skilled person will recognize that many changes and modifications may be made within the scope of the appended claims. For instance, it is not necessary that the vehicle is provided with an electric driveline.

The invention claimed is:

1. A method for operating a vehicle, wherein the vehicle comprises:
   a driveline configured to provide a driving power to at least one wheel of the vehicle for propulsion of the vehicle; and
   a wheel brake system configured to brake the vehicle, wherein the method comprises the steps of:
   receiving a control signal indicative of a request for an increase of the speed of the vehicle in the longitudinal direction of the vehicle, wherein the speed increase control signal is generated by an accelerator device, configured to be acted upon by a driver of the vehicle; and
   controlling the driveline in response to the speed increase control signal,
   wherein the method comprises the steps of:
   providing a speed increase threshold limit representing the highest increase of the speed of the vehicle in the longitudinal direction of the vehicle that can be allowed for the received speed increase control signal in the current circumstances;
   determining a resulting speed increase of the vehicle in the longitudinal direction of the vehicle that is or will be the result from the step of controlling the driveline in response to the speed increase control signal;
   comparing the resulting speed increase of the vehicle in the longitudinal direction of the vehicle with the corresponding speed increase threshold limit and determining whether the resulting speed increase of the vehicle in the longitudinal direction of the vehicle is or will be higher than the speed increase threshold limit; and
   when the resulting speed increase of the vehicle in the longitudinal direction of the vehicle is or will be higher than the speed increase threshold limit;
   applying the wheel brake system so as to reduce a rate at which the vehicle speed increases in the longitudinal direction of the vehicle towards the corresponding speed increase threshold limit.

2. The method according to claim 1, wherein the resulting speed increase is the actual vehicle acceleration and wherein the method comprises the step of
   determining the actual vehicle acceleration based on measurements of the vehicle's actual acceleration and/or actual speed.

3. The method according to claim 1, wherein the method comprises the step of:
   determining a magnitude or rate of change of the speed increase control signal.

4. The method according to claim 1, wherein the method comprises the step of:
   determining a current weight and/or a current speed of the vehicle.

5. The method according to claim 1, wherein the method comprises the step of:
   determining an inclination of the vehicle in a longitudinal direction thereof.

6. The method according to claim 1, wherein the method comprises the step of:
   determining whether a reverse gear of the vehicle is selected.

7. The method according to claim 1, wherein the driveline is an electric driveline comprising:
   an electric motor configured to provide a driving power to the at least one wheel of the vehicle for propulsion of the vehicle;
   a rechargeable energy storage system configured to provide the electric motor with electric energy; and
   a regenerative braking system configured to supply energy to the energy storage system while braking the vehicle,
   wherein the wheel brake system is configured to brake the vehicle as a complement or alternative to the regenerative braking system.

8. The method according to claim 7, wherein the method comprises the step of:
   determining a capacity of the regenerative braking system to supply energy to the energy storage system.

9. The method according to claim 8, wherein the wheel brake system is applied only when the capability of the regenerative braking system to supply energy to the energy storage system is below a capacity threshold limit.

10. The method according to claim 5, wherein the wheel brake system is applied only when the inclination of the vehicle in the longitudinal direction thereof is above an inclination threshold limit.

11. The method according to claim 6, wherein the wheel brake system is applied only when the reverse gear of the vehicle is selected.

12. A vehicle comprising:
    a driveline configured to provide a driving power to at least one wheel of the vehicle for propulsion of the vehicle;
    a wheel brake system configured to brake the vehicle; and
    a control circuit configured to perform:
    receiving a control signal indicative of a request for an increase of the speed of the vehicle in the longitudinal direction thereof, wherein the speed increase control signal is generated by an accelerator device, configured to be acted upon by a driver of the vehicle; and
    controlling the driveline in response to the speed increase control signal,
    providing an speed increase threshold limit representing the highest vehicle increase of the speed of the vehicle in the longitudinal direction of the vehicle that can be allowed for the received speed increase control signal in the current circumstances;
    determining a resulting speed increase of the vehicle in the longitudinal direction of the vehicle that is or will be the result from the step of controlling the driveline in response to the speed increase control signal;
    comparing the resulting speed increase of the vehicle in the longitudinal direction of the vehicle with the corresponding speed increase threshold limit and determining whether the resulting speed increase of the vehicle in the longitudinal direction of the vehicle is or will be higher than the speed increase threshold limit; and
    when the resulting speed increase of the vehicle in the longitudinal direction of the vehicle is or will be higher than the speed increase threshold limit;
    applying the wheel brake system so as to reduce a rate at which the vehicle speed increases in the longitudinal direction of the vehicle towards the corresponding speed increase threshold limit.

13. The vehicle according to claim 12, wherein the driveline is an electric driveline provided with:

an electric motor configured to provide a driving power to the at least one wheel of the vehicle for propulsion of the vehicle;

a rechargeable energy storage system configured to provide the electric motor with electric energy; and a regenerative braking system configured to supply energy to the energy storage system while braking the vehicle, wherein the wheel brake system is configured to brake the vehicle as a complement or alternative to the regenerative braking system.

14. A non-transitory computer readable medium carrying a computer program comprising program code for performing the steps of claim 1 when said program code is run on a computer.

15. A control circuit for controlling a vehicle, wherein the vehicle comprises: a driveline configured to provide a driving power to at least one wheel of the vehicle for propulsion of the vehicle; and a wheel brake system configured to brake the vehicle, the control circuit being configured to perform:

receiving a control signal indicative of a request for an increase of the speed of the vehicle in the longitudinal direction thereof, the speed increase control signal is generated by an accelerator device, configured to be acted upon by a driver of the vehicle; and controlling the driveline in response to the speed increase control signal, wherein the method comprises the steps of:

providing an speed increase threshold limit representing the highest increase of the speed of the vehicle in the longitudinal direction of the vehicle that can be allowed for the received speed increase control signal in the current circumstances;

determining a resulting speed increase of the vehicle in the longitudinal direction of the vehicle that is or will be the result from the step of controlling the driveline in response to the speed increase control signal;

comparing the resulting speed increase of the vehicle in the longitudinal direction of the vehicle with the corresponding speed increase threshold limit and determining whether the resulting speed increase of the vehicle in the longitudinal direction of the vehicle is or will be higher than the speed increase threshold limit; and when the resulting speed increase of the vehicle in the longitudinal direction of the vehicle is or will be higher than the speed increase threshold limit;

applying the wheel brake system so as to reduce a rate at which the vehicle speed increases in the longitudinal direction of the vehicle towards the corresponding speed increase threshold limit.

* * * * *